(12) United States Patent
Mayer et al.

(10) Patent No.: US 12,231,790 B2
(45) Date of Patent: Feb. 18, 2025

(54) METHOD FOR AUTOMATIC SENSOR PIXEL ARRANGEMENT OPTIMIZED FOR MULTIPLE CAMERA TASKS

(71) Applicants: Sony Group Corporation, Tokyo (JP); Sony Corporation of America, New York, NY (US)

(72) Inventors: Owen Mayer, Oakland, CA (US); Shohei Noguchi, Chiba (JP); Jiro Takatori, Tokyo (JP); Alexander Berestov, San Jose, CA (US)

(73) Assignees: SONY GROUP CORPORATION, Tokyo (JP); SONY CORPORATION OF AMERICA, New York, NY (US)

(*) Notice: Subject to any disclaimer, the term of this patent is extended or adjusted under 35 U.S.C. 154(b) by 334 days.

(21) Appl. No.: 17/842,077

(22) Filed: Jun. 16, 2022

(65) Prior Publication Data
US 2023/0269499 A1  Aug. 24, 2023

Related U.S. Application Data

(60) Provisional application No. 63/268,386, filed on Feb. 23, 2022.

(51) Int. Cl.
*H04N 25/702* (2023.01)
*G06T 7/00* (2017.01)
*H04N 17/00* (2006.01)

(52) U.S. Cl.
CPC ......... *H04N 25/702* (2023.01); *G06T 7/0002* (2013.01); *H04N 17/002* (2013.01);
(Continued)

(58) Field of Classification Search
CPC .. H04N 25/702; H04N 17/002; G06T 7/0002; G06T 2207/20081; G06T 2207/20084; G06T 2207/30168
(Continued)

(56) References Cited

U.S. PATENT DOCUMENTS 11,182,877 B2 * 11/2021 Zhu .................. G06N 3/045
2008/0278610 A1 * 11/2008 Boettiger ............. H04N 23/54
348/273
(Continued)

FOREIGN PATENT DOCUMENTS

EP           3826288 A     5/2021

OTHER PUBLICATIONS

Henz et al. ("Deep Joint Design of Color Filter Arrays and Demosaicing," 2018, Eurographics) (Year: 2018).*
Higham et al. ("Deep Learning for Real-Time Single-Pixel Video," 2018, Scientific Reports) (Year: 2018).*
Martel et al. ("Neural Sensors: Learning Pixel Exposures for HDR Imaging and Video Compressive Sensing with Programmable Sensors," 2020, IEEE) (Year: 2020).*
(Continued)

*Primary Examiner* — Matthew David Kim
(74) *Attorney, Agent, or Firm* — Trellis IP Law Group, PC (57) ABSTRACT

A method for optimization of alignment of pixels of X different types on a sensor array for the performance of N different camera tasks, where X and N are integers greater than 1, includes obtaining an output of each of the X types of pixel on the sensor array for an input image; evaluating the quality of the output for each of the N different camera tasks; and obtaining an optimal pixel alignment pattern by adjustment of a potential pixel alignment pattern with respect to performance of the N different camera tasks subject to a user-determined balance of priorities among the N different camera tasks.

20 Claims, 5 Drawing Sheets

(52) U.S. Cl.
CPC ............... *G06T 2207/20081* (2013.01); *G06T 2207/20084* (2013.01); *G06T 2207/30168* (2013.01)

(58) Field of Classification Search
USPC ......................................................... 348/154
See application file for complete search history.

(56) References Cited

U.S. PATENT DOCUMENTS

| | | | |
|---|---|---|---|
| 2017/0359534 A1* | 12/2017 | Li | H04N 5/265 |
| 2019/0164312 A1* | 5/2019 | Sunkavalli | G06N 3/08 |
| 2021/0241475 A1* | 8/2021 | Kutulakos | H04N 13/254 |
| 2021/0297607 A1* | 9/2021 | Wang | H04N 23/843 |
| 2022/0067954 A1* | 3/2022 | Shanmuganathan | G06V 10/764 |
| 2022/0338819 A1* | 10/2022 | Stayman | A61B 6/545 |
| 2022/0383476 A1* | 12/2022 | Varekamp | G06T 7/0002 |
| 2023/0027622 A1* | 1/2023 | Haeusler | G01S 7/497 |
| 2023/0153510 A1* | 5/2023 | Yang | G06F 30/398 716/52 |
| 2023/0197534 A1* | 6/2023 | Mastro | H01L 22/12 438/16 |
| 2023/0419897 A1* | 12/2023 | Zhang | H10K 59/353 |

OTHER PUBLICATIONS

Henz, Bernardo, Eduardo SL Gastal, and Manuel M. Oliveira. "Deep joint design of color filter arrays and demosaicing." Computer Graphics Forum. vol. 37. No. 2. 2018.

Huijben, Iris AM, Bastiaan S. Veeling, and Ruud JG van Sloun. "Deep probabilistic subsampling for task-adaptive compressed sensing." International Conference on Learning Representations. 2019.

Li, Jia, et al. "Optimized color filter arrays for sparse representation-based demosaicking." IEEE Transactions on Image Processing 26.5 (2017): 2381-2393.

Martel, J. N. P., Muller, L. K., Carey, S. J., Dudek, P., & Wetzstein, G. (2020). Neural Sensors: Learning Pixel Exposures for HDR Imaging and Video Compressive Sensing with Programmable Sensors. IEEE Transactions on Pattern Analysis and Machine Intelligence, 42(7), 1642-1653. [9064896] https://doi.org/10.1109/TPAMI.2020.2986944.

Ayan Chakrabarti: "Learning Sensor Multiplexing Design through Back-propagation", arxiv.org, Cornell University Library, 201 Olin Library Cornell University Ithaca, NY 14853, May 23, 2016 (May 23, 2016), 9 pages, XP080702982, section 3.1, 3.2, 4; figure 1.

David J Brady et al: "Smart Cameras", arxiv.org, Cornell University Library, 201 Olin Library Cornell University Ithaca, NY 14853, Feb. 11, 2020 (Feb. 11, 2020), XP081597787, abstract; figures 1, 9.

* cited by examiner

Figure 5

METHOD FOR AUTOMATIC SENSOR PIXEL ARRANGEMENT OPTIMIZED FOR MULTIPLE CAMERA TASKS

CROSS REFERENCES TO RELATED APPLICATIONS

This application claims the benefit of U.S. Provisional Patent Application Ser. No. 63/268,386, entitled "Method for Arranging Sensor Pixels", filed on Feb. 23, 2022 (SYP347918US01), which is hereby incorporated by reference as if set forth in full in this application for all purposes.

BACKGROUND

Modern camera image sensors typically include pixels of different types. Some types are specialized in ways that address aspects of captured image quality, such as accurate color representation (using color filter array pixels), or high dynamic range (using a combination of pixels of high sensitivity and pixels with high threshold saturation limits). Other types are designed to address aspects that do not determine the quality of the image captured by the sensor array, but that are relevant to the performance of downstream camera tasks involving image processing, such as autofocus, object recognition, object deletion, or depth determination. Phase sensitive pixels of various sub-types are often involved in these cases.

The pattern in which pixels of different types are arranged (aligned) over the image sensor plane plays a major part in determining aspects of captured images, some of which pertain directly to the quality of images captured by the image sensor, while others pertain to downstream camera tasks that take the captured images as input to be analyzed. However, a particular pattern that is advantageous to the performance of one camera task of interest to the user may be detrimental to the performance of another camera task, also of interest to the user, so it may be desirable to find an "optimized" pattern that balances priorities of the camera user across two or more tasks.

Manual design of an optimized pixel alignment pattern that will yield good performance for one or more camera tasks, deemed to be of high priority, at the cost of reduced performance for one or more camera tasks of lower priority is a time consuming and expensive process for camera manufacturers.

Some approaches to automate pixel alignment design for the single objective of accurate color reproduction in the image output by the camera have been proposed. In this case, the task is to maximize the color fidelity captured by the image sensor array, the fidelity being determined in large part by the arrangement of color filter array (CFA) pixels of three or more sub-types over the sensor array. All the pixels are of the same basic type, responding to the luminance or intensity of incident light so that their outputs may be simply combined to yield an image that shows the spatial variation of light emanating from surfaces of the object being imaged. The sub-types of the pixels differ from each other only in the spectral transmission of the filter fabricated on or over the top layer of pixels of a given sub-type, so that the filter selectively blocks light outside a corresponding spectral band. In an RGB image sensor system, for example, the three sub-types of CFA pixels are created by red, blue, and green filters respectively, and a typical alignment or arrangement of the filtered pixels is a 2×2 Bayer block pattern, repeated over the entire sensor array, where the green-filtered pixels lie on one diagonal, and red- and blue-filtered pixels occupy the other two spaces. It has been found that improved color performance may be achieved with more complicated alignments involving, in one example, blocks of 4×2 pixels of 4 different color-filtered sub-types, but many other combinations may be (and have been) envisaged.

Another example of an automated approach to pixel alignment is a design process for a pattern of shutter functions superimposed on the pixel array of an image sensor, with the objective in this case being to maximize dynamic range in the captured images. The pixels in the array are again of one fundamental type, capturing grey-level (as in this case there are no color filters) luminance, and the "alignment pattern" is not actually a pattern of different pixel types or even sub-types, but a spatial distribution over the sensor plane of a set of circuitry parameters that determine exposure time, varying in a continuous fashion over the whole array. The spatial distribution of exposure times over the array of pixels largely determines the dynamic range achievable in images captured by those pixels To date, approaches have targeted the problem of optimizing pixel alignment over the image sensor for a single camera task, where only one type of pixel is involved, those pixels determining aspects of image quality. No approaches seem to have addressed the problem of simultaneously optimizing the performance of more than one camera task, taking their relative priorities into account. In these situations, which may be of great practical significance to the end user, a mixture of different pixel types may be involved, where one type may not even be relevant to the perceived quality of a captured image; phase sensitive pixels are one such example, needed for such tasks as camera autofocus, 3D reconstruction, etc.

There is therefore a need for systems and methods of automating pixel alignment design for image sensors having pixels of at least two different types, to optimize overall camera performance in a way that achieves a desired balance between the performance of two or more different tasks.

SUMMARY

The present invention includes methods and systems for optimization of alignment of pixels of X different types on an image sensor array for the performance of N different camera tasks, where X and N are integers greater than 1.

In one embodiment, a method comprises: obtaining an output of each type of pixel on the sensor for an input image; evaluating the quality of the output for each of the N camera tasks; and obtaining an optimal pixel alignment pattern by adjustment of a potential pixel alignment pattern with respect to performance of the N camera tasks subject to a user-determined balance of priorities among the N camera tasks.

In another embodiment, a method comprises: simulating pixel response for training images, such that for each training image, X sensor images are output, each sensor image corresponding uniquely to pixels of only one of X different types, positioned at each location possible on the image sensor array; generating, in a trainable pixel alignment layer, a pixel alignment pattern according to which pixels of the X different types are distributed over the image sensor array locations as a 2D tessellation; subsampling each of the X sensor images according to the pixel alignment pattern to output X corresponding subsampled sensor images; and simultaneously training the pixel alignment layer and a stack of N neural networks, each neural network corresponding uniquely to only one of N different camera tasks and accepting and processing one or more of the X subsampled sensor images, making discrete, categorical choices of pixels of the X different types such that the pixel alignment pattern is optimized with respect to performance of the N camera tasks subject to a user-determined balance of priorities among the N camera tasks.

In another embodiment, an apparatus comprises: one or more processors; and logic encoded in one or more non-transitory media for execution by the one or more processors and when executed operable to: simulate pixel response for training images, such that for each training image, X sensor images are output, each sensor image corresponding uniquely to pixels of only one of X different types, positioned at each location possible on the image sensor array; generate, in a trainable pixel alignment layer, a pixel alignment pattern according to which pixels of the X different types are distributed over the image sensor array locations as a 2D tessellation; subsample each of the X sensor images according to the pixel alignment pattern to output X corresponding subsampled sensor images; and simultaneously train the pixel alignment layer and a stack of N neural networks, each neural network corresponding uniquely to only one of N different camera tasks and accepting and processing one or more of the X subsampled sensor images, making discrete, categorical choices of pixels of the X different types such that the pixel alignment pattern is optimized with respect to performance of the N camera tasks subject to a user-determined balance of priorities among the N camera tasks.

In yet another embodiment, a system comprises: a pixel response simulator; a trainable pixel alignment layer; a subsampler; and a stack of N trainable neural networks, each neural network corresponding uniquely to only one of N camera tasks; wherein the pixel response simulator is configured to operate on training images to deliver to the subsampler, for each training image, X sensor images, each sensor image corresponding uniquely to pixels of only one of X different types, positioned at each location possible on the image sensor array; wherein the trainable pixel alignment layer is configured to generate and deliver to the subsampler a pixel alignment pattern according to which pixels of the X different types are distributed over the image sensor array locations as a 2D tessellation; wherein the subsampler is configured to subsample each of the X sensor images according to the pixel alignment pattern and to deliver one or more subsampled output images to one or more of the neural networks to be processed therein; and wherein the N neural networks and the pixel alignment layer are simultaneously trained using inner feedback loops and an outer feedback loop respectively, making discrete, categorical choices of pixels of the X different types such that the pixel alignment pattern is optimized with respect to performance of the N camera tasks subject to a user-determined balance of priorities among the N camera tasks.

A further understanding of the nature and the advantages of particular embodiments disclosed herein may be realized by reference to the remaining portions of the specification and the attached drawings.

DETAILED DESCRIPTION OF EMBODIMENTS

Described herein are embodiments of systems and methods for optimizing alignment of pixels of two or more different types on an image sensor array, for the performance of two or more camera tasks, taking task priority levels into account.

Figure 1:
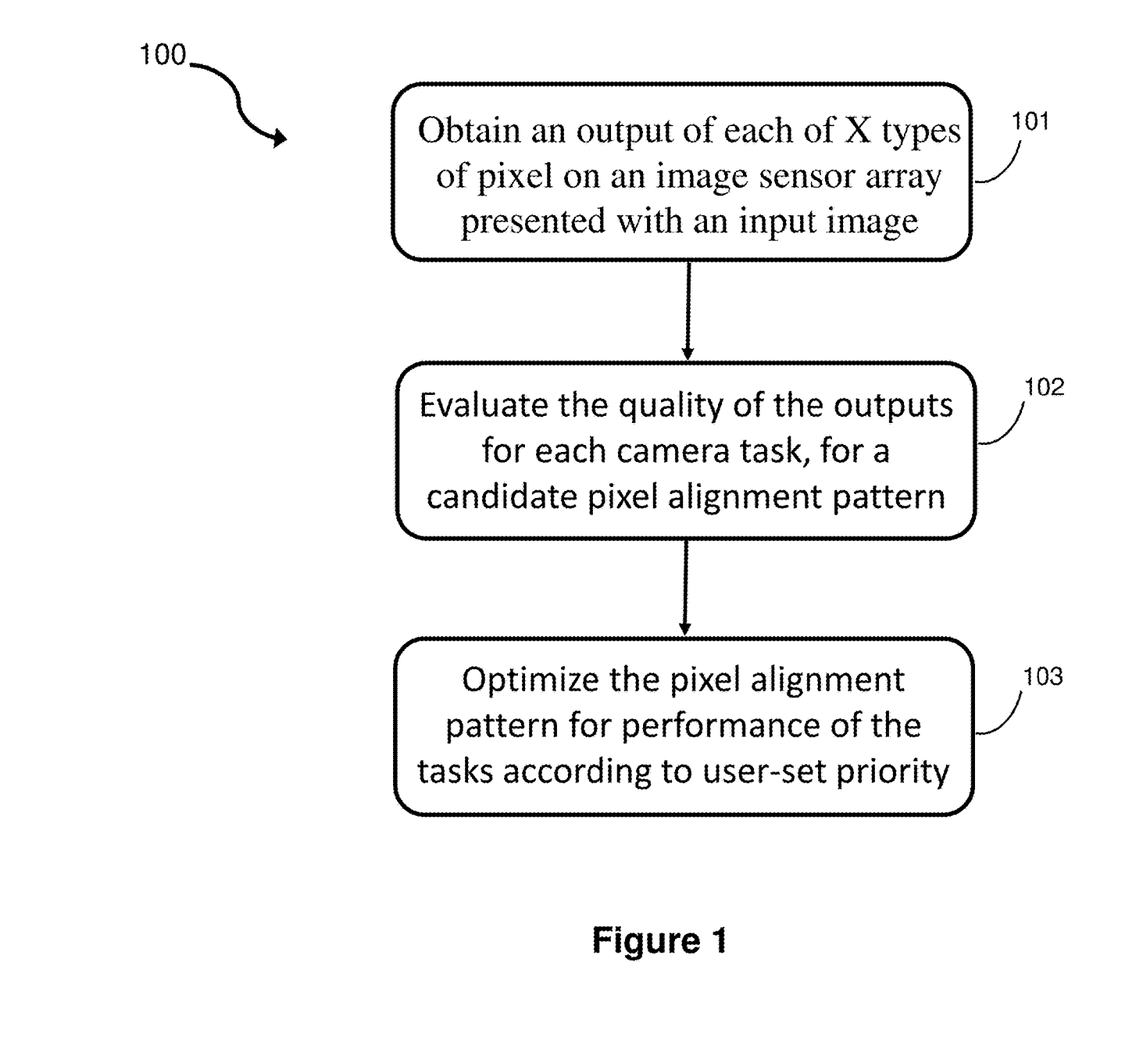
FIG. 1 is a flowchart illustrating steps of a method according to some embodiments of the present invention

FIG. 1 is a flowchart illustrating steps of a method 100 according to some embodiments of the present invention. At step 101, an output of each type of pixel on an image sensor array presented with an input image is obtained. At step 102, for a potential pixel alignment pattern on the sensor array, the quality of the outputs is evaluated for each of the N camera tasks. At step 103, an optimal pixel alignment pattern is obtained by adjusting the potential pixel alignment pattern with respect to performance of the N camera tasks, subject to a user-determined balance of priorities among the N camera tasks.

In some embodiments of method 100, obtaining the optimal pixel alignment pattern comprises evaluating all possible combinations of pixel alignments on the sensor array. In other embodiments, it comprises using one or more rule-based algorithms. In some embodiment of method 100, obtaining the optimal pixel alignment pattern comprises using machine learning. The machine learning may utilize a trainable pixel alignment layer, in some cases involving a continuous relaxation technique. Alternatively, the machine learning may utilize a reinforcement learning technique.

In some embodiments of method 100, the sensor array comprises a tessellation of identical pixel blocks, where each block comprises a first arrangement of pixels of the X different types; and where obtaining the optimal pixel alignment pattern comprises obtaining an optimal arrangement of pixels of the X different types in one block. In one subset of these embodiments, obtaining the optimal arrangement of pixels in each block comprises evaluating all possible combinations of pixel alignments in the block. In another subset of these embodiments, obtaining the optimal arrangement of pixels in each block comprises using one or more rule-based algorithms. In yet another subset of these embodiments, obtaining the optimal arrangement of pixels in each block comprises using machine learning, where the machine learning may utilize a trainable pixel alignment layer, in some cases involving a continuous relaxation technique, or alternatively, the machine learning may utilize a reinforcement learning technique.

In other embodiments of method 100, the sensor array comprises a tessellation of first and second pixel blocks, where each of the first blocks comprises a first arrangement of pixels of the X different types, where each of the second blocks comprising a second arrangement, different from the first arrangement, of pixels of the X different types, and where obtaining the optimal pixel alignment pattern comprises obtaining an optimal arrangement of pixels of the X different types in a first block and in a second block. Subsets of embodiments may readily be envisaged for the various options discussed above regarding different ways of obtaining the optimal pixel alignment pattern (evaluating all possible combinations, using rule-based algorithms etc.).

In some embodiments of method 100, each pixel type is characterized by one or more associated tunable parameters, such as phase angle, filter wavelength, etc. In some embodiments of method 100, step 101, in which an output of each type of pixel on the sensor is obtained, comprises simulating a response of that type of pixel. A description of how this may be done is presented below, with reference to system 200, illustrated in FIG. 2. In other embodiments, obtaining those outputs comprises measuring a response of each type of pixel, rather than simulating it. This may be done by physically using a camera to capture an image and recording pixel responses directly.

Figure 2:
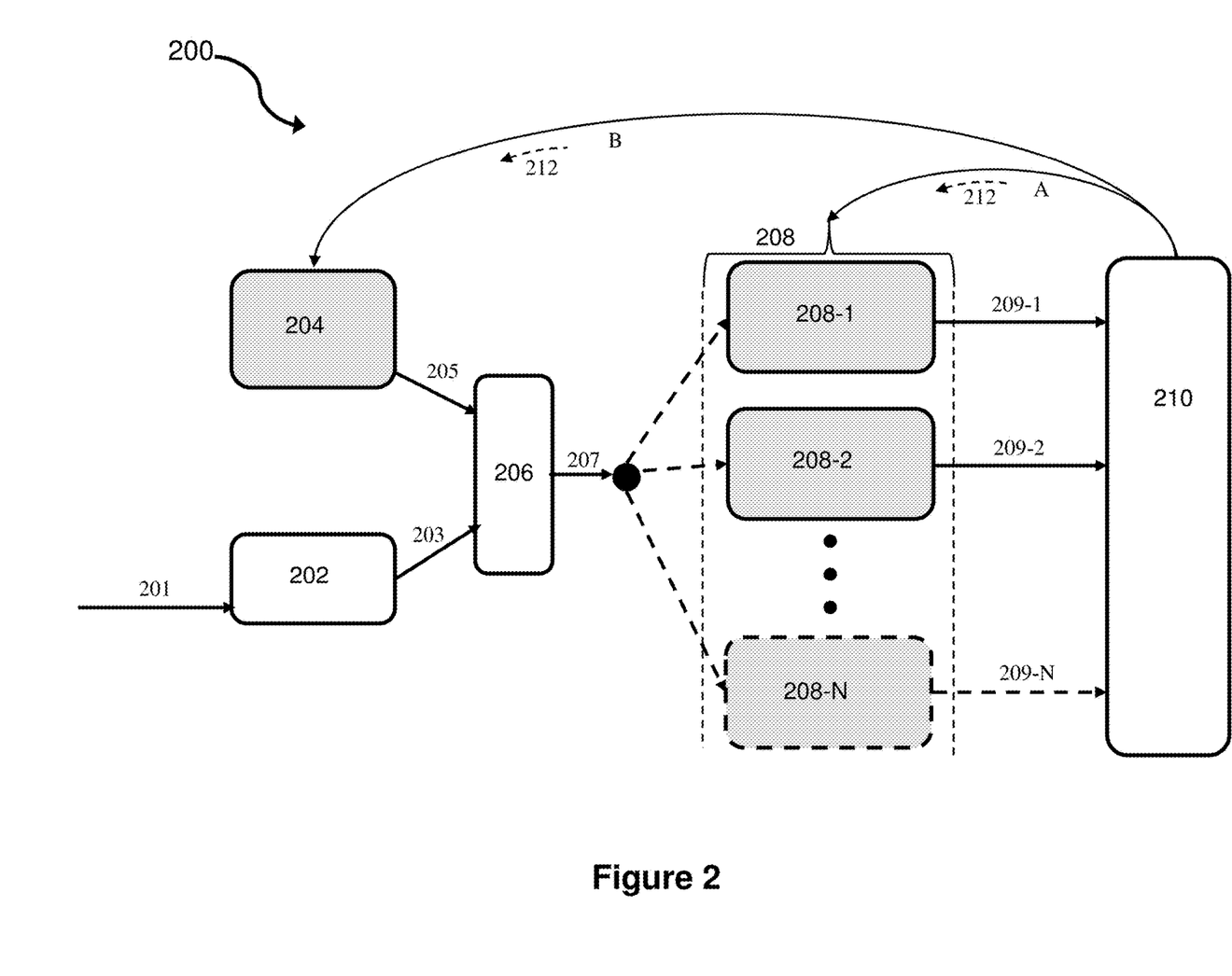
FIG. 2 illustrates in block diagram form a system according to some embodiments of the present invention.

FIG. 2 illustrates a system 200 according to some embodiments of the present invention. This system in essence carries out method 100 using a particular combination of choices for implementing steps 101, 102 and 103. Other systems may be envisaged that use other choices, without departing from the spirit and scope of the present invention.

Pixel response simulator 202 accepts a training image 201 from a training image database (not shown) and generates a plurality of X sensor images 203, one for each type of pixel whose response is simulated, delivering the images to subsampler 206. Trainable pixel alignment layer module 204 generates a pixel alignment pattern 205 for the mixture of pixel types, delivering that pattern to subsampler 206. Subsampler 206 operates on each one of the received sensor images 203 in turn, extracting data for pixels of that corresponding pixel type at each location indicated for that pixel type in pattern 205 for one block, and then tessellating the resulting fractional part of the simulated sensor image over the sensor array. In this way, subsampler 206 generates X subsampled images 207, one image for each of the X types of pixels.

A stack 208 of N trainable networks receives the subsampled images 207, such that each individual network, dedicated to simulating just one camera processing task, receives one or more of the subsampled images as appropriate for the operation of that particular task. So, for example, network 208-1, dedicated to simulating camera processing task #1, receives one or more of the subsampled images as appropriate for the operation of task #1, network 208-2, for task #1, receives whichever subsampled image or images are relevant to task #2 network, and so on. There may, but need not, be some overlap between subsampled images sent to different networks, depending on the nature of the corresponding camera tasks, as will be discussed below in regard to FIGS. 3 and 4.

In some embodiments, each of the N neural network may receive all of the X subsampled images, processing some of them using information that does not directly relate to the specific camera task of that particular network but provides relevant side information. Each network of stack 208 provides an output value reflective of how well it currently performs its corresponding task, so that 208-1 provides a performance value 209-1 for its performance of task #1, 208-2 provides 109-2, and so on with network 208-N providing 209-N for the Nth task. The individual performance values are input to module 210, which calculates a combination performance value[1] 212, reflective of how well all N tasks may be performed for the current version of pixel alignment pattern 205 and the current internal organization of each network. The calculation involves weighting the individual performance values according to predetermined task priority parameters. In some cases, these parameters may be supplied as another input (not shown) to module 210.

The combination performance value 212 is fed back from the output of module 210 though inner and outer feedback loops, simultaneously. The inner loop includes path A between module 210 and stack 208, allowing each of the networks 208-1 through 208-N to self-train to optimize performance value 212. In some embodiments this means to minimize a corresponding combined loss value. The outer loop includes path B between module 210 and pixel alignment layer 204, allowing that layer 204 to be trained to optimize performance value 212 by optimizing pixel alignment pattern 205.

[1] Another term in optimization literature for "combination performance value" is "objective function".

The training of system 200 is continued according to the process described above for each of a series of training image available from the database.

Modules 204 and 208 are tunable, allowing them to be optimized using cues from the combination performance value 212.

One possible method for performing this optimization is by using stochastic gradient descent, which computes the gradient of the performance values with respect to the tunable parameters (neural network weights) and applies an update to the tunable parameters the direction of the gradient, thereby increasing the performance value. In the framework of stochastic gradient descent, all modules between the trainable module and the performance value are required to be differentiable.

Given these requirements, it may be appreciated that a trainable alignment layer such as layer 204 in FIG. 2 must be defined as a differentiable function. The gradient of the performance value has to somehow be computed with respect to different pixel choices. However, due to the discrete nature of pixel choices the gradient will be undefined.

To address this, the present invention implements layer 204 using a method that approximates the discrete pixel choices in a way that is differentiable.

The method used in some embodiments of the present invention falls under the umbrella of 'continuous relaxation', a technique used to address a general category of problems where a derivative and/or gradient needs to be computed from a non-differentiable discrete or categorical function, by recasting it to an approximation that uses continuous variables.

While continuous relaxation is one way of approximating the non-differentiable function with a differentiable function, there are other methods that could be considered in other embodiments.

By implementing 204 with a differentiable approximation, the present invention now enables the sensor designer to optimize a sensor where discrete and categorical design choices can be made. This contrasts with prior art, which restricts the optimization space to only be continuous.

Figure 3:
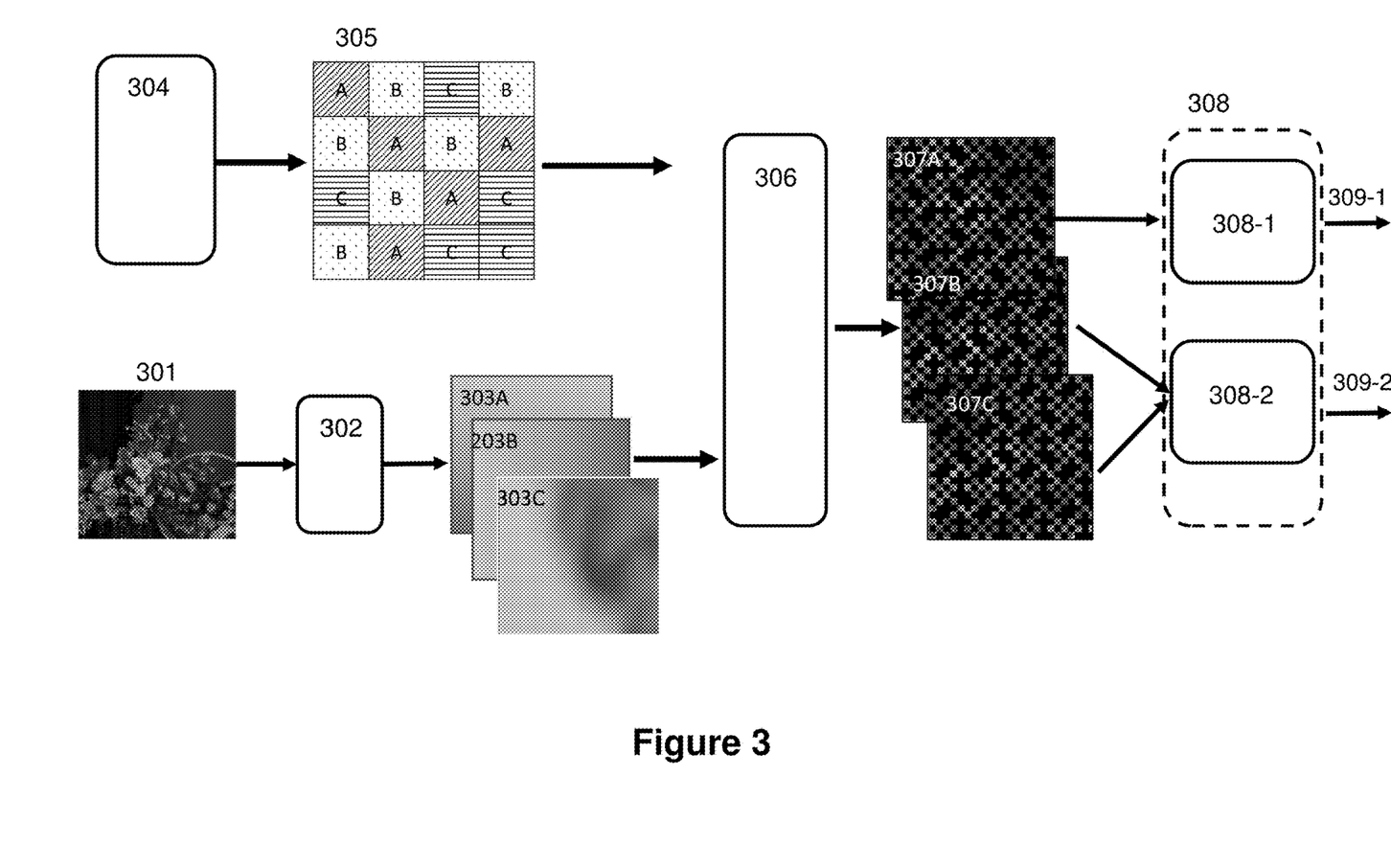
FIG. 3 illustrates a portion of a system according to the FIG. 2 embodiments.

FIG. 3 illustrates a portion of the system of the type shown in FIG. 2, for one exemplary embodiment where there are three different pixel types to be arranged on the sensor, and two different camera tasks of interest. In this embodiment, pixel response simulator 302 accepts training image 301 and outputs three sensor images, 303A, 303B and 303C, where 303A shows what the sensor output would be if the sensor array just had "A" type pixels at every pixel location over a sensor array, and 303B and 303C do the same for "B" and "C" type pixels respectively.

Pixel alignment layer 304 generates pattern 305 in the form of a 4×4 block, which would be repeated (not shown) as a 2D tessellation over the image sensor array surface. Each block happens to have 5 of each of the "A" and "C" type pixels and 6 of the "B" ones, the latter being arranged diagonally, but it should be understood this is just one "candidate" for an optimized arrangement.

Subsampler 306 operates on sensor images 303A, 303B, and 303C, extracting data for pixels of types A, B and C at each block indicated for that pixel type in pattern 305, and then tessellating the resulting fractional part of the simulated sensor image over the sensor array. The resulting output is three subsampled images 307A, 307B, and 307C.

In this exemplary system with two camera tasks of interest, stack 308 is made up of two corresponding trainable neural networks 308-1 and 308-2, delivering outputs 309-1 and 309-2. In the case shown, the performance of network 308-1's camera task is affected solely by how pixels of type A function, not by pixels of type B or C, so only subsampled image 307A is fed into that network as an input, The task of network 308-1 may, for example, be an object recognition task, determined entirely by pixels of type A. At the same time, the performance of the camera task corresponding to network 308-2 may be affected to a significant extent by how pixels of type B and type C function, so network 308-2 will require both images 307B and 307C to be provided as inputs. The task of network 308-2 may, for example, be an "image quality" task, to provide images with high dynamic range, for which a mixture of pixels of high sensitivity and pixels of high saturation thresholds may be necessary.

In some systems similar to that shown in FIG. 3, all three types of pixels may be relevant to the performance of both tasks of interest. In other embodiments, not shown, at least one pixel type may be relevant to both of the camera tasks, and so on. The number of variations will increase, of course, as more pixel types and/or more camera tasks are modeled. A key feature of all embodiments of the current invention is that the X pixel types are distinctly different from each other, and the N camera tasks are distinctly different from each other. In many cases, at least one of the tasks achieves an image quality objective, determined by pixels of one or more types within one subcategory of simple image capture pixels, while another of the tasks achieves an objective that depends on pixels of a distinctly different type, such as phase detection pixels. Producing an image with high dynamic range is one example of an image quality task, while processing a captured image to identify objects of a particular shape in the scene is an example of a very different type of camera or image processing task. Other tasks could include generating a depth map, or producing a semantic understanding of the scene Returning to FIG. 3, the outputs of the two networks are performance values 309-1 and 309-2, respectively, which are then fed into a module (not shown) corresponding to module 210 of system 200, that operates on those values to generate a combination performance value reflective of how well the pair of tasks would be performed for the current version of pixel alignment pattern 305 for the three pixel types of interest, and for the current internal organization of the neural networks 308-1 and 308-2. The combined performance value is fed back to the neural networks in stack 308 and to the pixel alignment layer 304, generating improved network parameters and pixel alignment patterns by processes well known in the art of deep learning for system parameter optimization.

Figure 4:
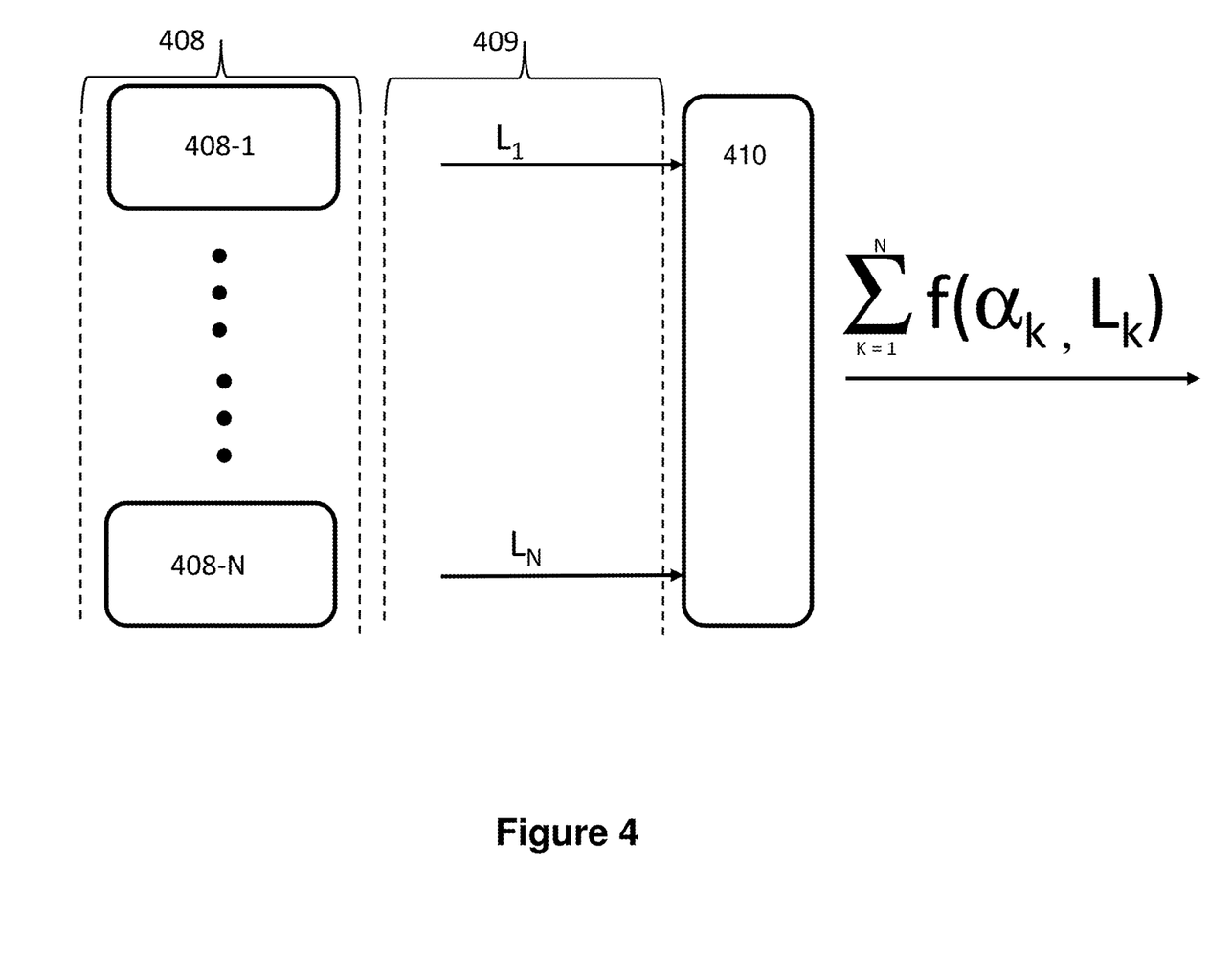
FIG. 4 illustrates how a combined performance value may be calculated in terms of task loss in some of the FIG. 2 embodiments.

FIG. 4 indicates how performance values may be calculated and processed in some embodiments of the present invention where performance values are expressed as loss values which are inversely related to how well the tasks are performed. In the case shown, there are N neural networks in stack 408, where the first network outputs a performance value 408-1 in the form of a task loss $L_1$ and so one until the last, Nth network, outputs a performance value 408-N in the form of a task loss $L_N$. Then at module 410, a combined performance value is calculated as a combination of a function of each performance value and a corresponding weighting parameter α for each task, so that the kth term in the function, where k varies from 1 to N, is represented as f ($α_k$, $L_k$). In some embodiments, the function may depend linearly on the individual performance value, so that the kth term would be $α_k * L_k$, for example. In other embodiments, the function may be nonlinear, depending, for example, on $(L_k)^2$. The weighting parameters, indicating relative priorities of the N tasks, may be predetermined inputs embedded into the system, or as adjustable parameters set by a user training the system according to their preferences.

Other options may readily be envisaged for training systems of the present invention, in which performance values are again be expressed as loss values which are inversely related to how well the tasks are performed, but where the combined performance value is calculated as a combination of a function of each performance value and two or more task-specific weighting parameters. In a 2-parameter case, for example, the kth term in the function may be $[(α_κ)^2 * L_k] + [β_κ * (L_k)^2]$ for example. Many variations may be envisaged, some of which could involve more than two weighting parameters.

Figure 5:
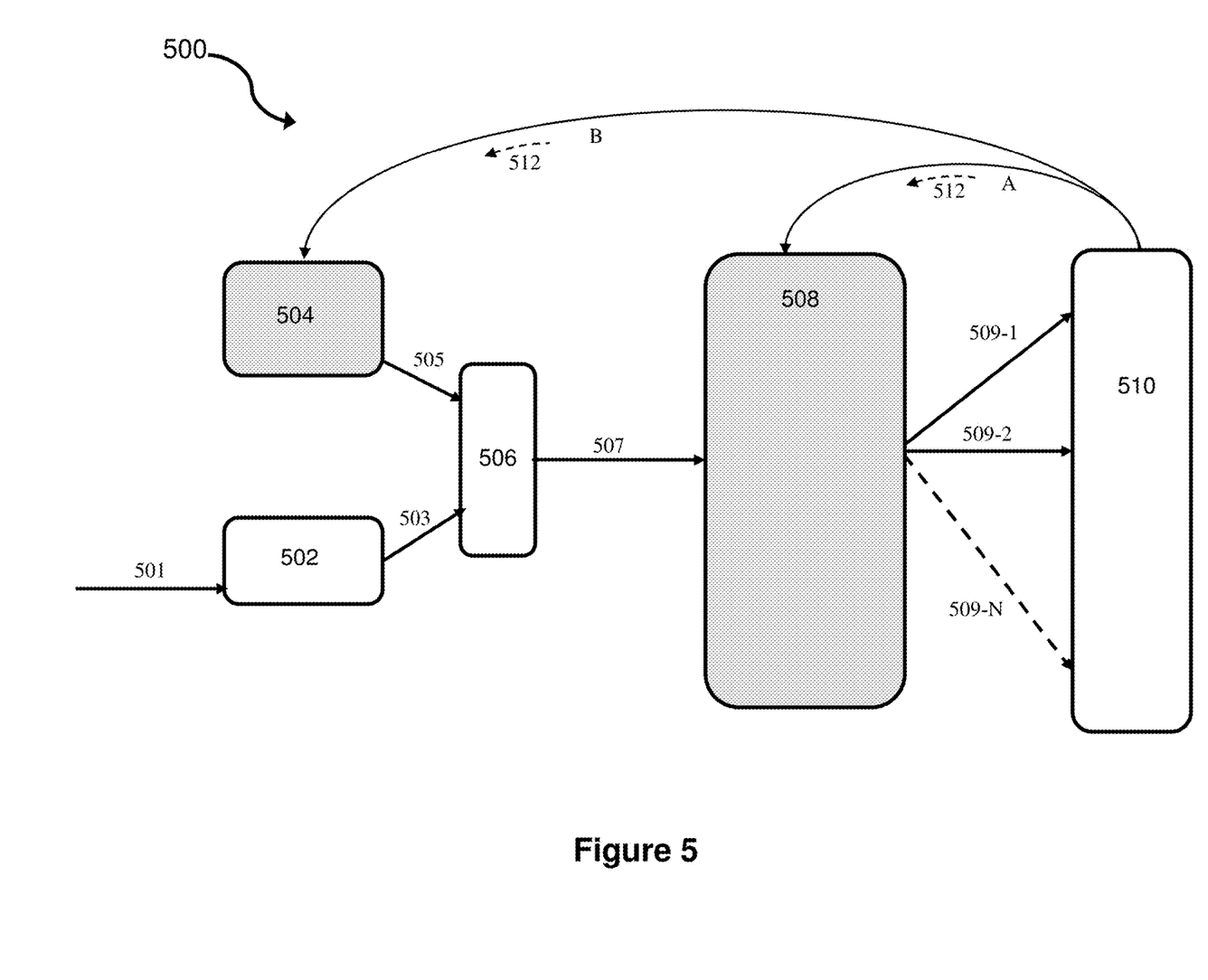
FIG. 5 illustrates in block diagram form a system according to some embodiments of the present invention.

The embodiments described above and shown in the figures all involve the use of a stack of separate neural networks, but the present invention is not necessarily limited to this particular architecture. FIG. 5 illustrates some other embodiments, in which there is one large 'super' neural network 508 into which all X sensor images are input, and which outputs N values corresponding to each task. Other elements of system 500 operate just as system 200 illustrated in FIG. 2, as follows.

Pixel response simulator 502 accepts a training image 501 from a training image database (not shown) and generates a plurality of X sensor images 503, one for each type of pixel whose response is simulated, delivering the images to subsampler 506. Trainable pixel alignment layer module 504 generates a pixel alignment pattern 505 for the mixture of pixel types, delivering that pattern to subsampler 506. Subsampler 506 operates on each one of the received sensor images 503 in turn, extracting data for pixels of that corresponding pixel type at each location indicated for that pixel type in pattern 505 for one block, and then tessellating the resulting fractional part of the simulated sensor image over the sensor array. In this way, subsampler 506 generates X subsampled images 507, one image for each of the X types of pixels.

However, trainable network 508 receives all the images 507, and provides N output values, one for each of the N camera tasks of interest, indicating how well the system currently performs that corresponding task, The individual performance values are input to module 510, which calculates a combination performance value 512, reflective of how well all N tasks may be performed for the current version of pixel alignment pattern 505 and the current internal organization of super network 508. The calculation involves weighting the individual performance values according to predetermined task priority parameters. In some cases, these parameters may be supplied as another input (not shown) to module 510.

Embodiments of the present invention offer a major advantage over prior art in this field, in providing systems and methods for automatic optimization of alignment of pixels of different basic types for a camera intended to perform more than one task, while taking into account a user-determined priority between those tasks. In some embodiments, this is achieved by performing an end-to-end training of a system including a stack of task-specific neural networks and a trainable pixel alignment layer, with the user setting one or more parameters that serve to balance competing aspects of camera performance.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for optimization of alignment of pixels of X different types on a sensor array for a camera capable of performing N different camera tasks, where X and N are integers greater than 1; the method comprising:
obtaining an output of each of the X types of pixel on the sensor array for an input image;
evaluating a quality of the output for each of the N different camera tasks; and
obtaining an optimal pixel alignment pattern by adjustment of a potential pixel alignment pattern with respect to performance of the N different camera tasks subject to a user-determined balance of priorities among the N different camera tasks, wherein obtaining the optimal pixel alignment pattern comprises evaluating all possible combinations of pixel alignments on the sensor array.

2. A method for optimization of alignment of pixels of X different types on a sensor array for a camera capable of performing N different camera tasks, where X and N are integers greater than 1; the method comprising:
obtaining an output of each of the X types of pixel on the sensor array for an input image;
evaluating a quality of the output for each of the N different camera tasks; and
obtaining an optimal pixel alignment pattern by adjustment of a potential pixel alignment pattern with respect to performance of the N different camera tasks subject to a user-determined balance of priorities among the N different camera tasks, wherein obtaining the optimal pixel alignment pattern comprises using one or more rule-based algorithms.

3. A method for optimization of alignment of pixels of X different types on a sensor array for a camera capable of performing N different camera tasks, where X and N are integers greater than 1; the method comprising:
obtaining an output of each of the X types of pixel on the sensor array for an input image;
evaluating a quality of the output for each of the N different camera tasks; and
obtaining an optimal pixel alignment pattern by adjustment of a potential pixel alignment pattern with respect to performance of the N different camera tasks subject to a user-determined balance of priorities among the N different camera tasks, wherein obtaining the optimal pixel alignment pattern comprises using machine learning.

4. The method of claim 3, wherein using machine learning comprises utilizing a trainable pixel alignment layer.

5. The method of claim 4, wherein utilizing a trainable pixel alignment layer comprises using a continuous relaxation technique.

6. The method of claim 3, wherein machine learning comprises utilizing a reinforcement learning technique.

7. A method for optimization of alignment of pixels of X different types on a sensor array for a camera capable of performing N different camera tasks, where X and N are integers greater than 1; the method comprising:
- obtaining an output of each of the X types of pixel on the sensor array for an input image;
- evaluating a quality of the output for each of the N different camera tasks; and
- obtaining an optimal pixel alignment pattern by adjustment of a potential pixel alignment pattern with respect to performance of the N different camera tasks subject to a user-determined balance of priorities among the N different camera tasks,
- wherein the sensor array comprises a tessellation of identical pixel blocks, each block comprising an arrangement of pixels of the X different types; and
- wherein obtaining the optimal pixel alignment pattern comprises obtaining an optimal arrangement of pixels of the X different types in one block.

8. The method of claim 7, wherein obtaining the optimal arrangement of pixels in each block comprises evaluating all possible combinations of pixel alignments in the block.

9. The method of claim 7, wherein obtaining the optimal pixel alignment pattern comprises using one or more rule-based algorithms.

10. The method of claim 7, wherein obtaining the optimal pixel alignment pattern comprises using machine learning.

11. The method of claim 10, wherein using machine learning comprises utilizing a trainable pixel alignment layer.

12. The method of claim 11, wherein utilizing a trainable pixel alignment layer comprises using a continuous relaxation technique.

13. The method of claim 10, wherein using machine learning comprises utilizing a reinforcement learning technique.

14. A method for optimization of alignment of pixels of X different types on a sensor array for a camera capable of performing N different camera tasks, where X and N are integers greater than 1; the method comprising:
- obtaining an output of each of the X types of pixel on the sensor array for an input image;
- evaluating a quality of the output for each of the N different camera tasks; and
- obtaining an optimal pixel alignment pattern by adjustment of a potential pixel alignment pattern with respect to performance of the N different camera tasks subject to a user-determined balance of priorities among the N different camera tasks,
- wherein the sensor array is a tessellation of first and second pixel blocks, each of the first blocks comprising a first arrangement of pixels of the X different types, and each of the second blocks comprising a second arrangement, different from the first arrangement of pixels of the X different types; and
- wherein obtaining the optimal pixel alignment pattern comprises obtaining an optimal arrangement of pixels in a first block and in a second block.

15. A method for optimization of alignment of pixels of X different types on an image sensor array for for a camera capable of performing N different camera tasks, where X and N are integers greater than 1; the method comprising:
- simulating pixel response for training images, such that for each training image, X sensor images are output, each sensor image corresponding uniquely to pixels of only one of the X different types, positioned at each location possible on the image sensor array;
- generating, in a trainable pixel alignment layer, a pixel alignment pattern according to which pixels of the X different types are distributed over the image sensor array locations as a 2D tessellation;
- subsampling each of the X sensor images according to the pixel alignment pattern to output X corresponding subsampled sensor images; and
- simultaneously training the pixel alignment layer and a stack of N neural networks, each neural network corresponding uniquely to only one of the N different camera tasks and accepting and processing one or more of the X subsampled sensor images, making discrete, categorical choices of pixels of the X different types such that the pixel alignment pattern is optimized with respect to performance of the N different camera tasks subject to a user-determined balance of priorities among the N different camera tasks.

16. The method of claim 15, wherein simultaneously training the pixel alignment layer and N neural networks comprises concurrent use of an inner feedback loop, feeding a combined performance value output derived from the N outputs from the stack back to each of the N neural networks, and an outer feedback loop, feeding the combined performance value back to the trainable pixel alignment layer.

17. The method of claim 16, wherein the combined performance value output from the stack comprises a total loss value comprising a combination of performance value outputs from each of the N neural networks, each performance value output being a function of loss value for the corresponding neural network and of at least one user-supplied weighting parameter for the camera task corresponding to that neural network.

18. The method of claim 17, wherein the function of loss value and at least one user-supplied weighting parameter for one of the neural networks comprises a linear function of that loss value.

19. The method of claim 15, wherein at least one of the N tasks depends primarily on image quality captured by pixels at the sensor array and wherein at least another one of the N tasks does not depend primarily on image quality captured by pixels at the sensor array.

20. A system for optimization of alignment of pixels of X different types on an image sensor array for a camera capable of performing N different camera tasks, where X and N are integers greater than 1; the system comprising:
- a pixel response simulator;
- a trainable pixel alignment layer;
- a subsampler; and
- a stack of N trainable neural networks, each neural network corresponding uniquely to only one of the N different camera tasks;
- wherein the pixel response simulator is configured to operate on training images to deliver to the subsampler, for each training image, X sensor images, each sensor image corresponding uniquely to pixels of only one type, positioned at each location possible on the image sensor array;
- wherein the trainable pixel alignment layer is configured to generate and deliver to the subsampler a pixel alignment pattern according to which pixels of the X different types are distributed over the image sensor array locations as a 2D tessellation;
- wherein the subsampler is configured to subsample each of the X sensor images according to the pixel alignment pattern and to deliver one or more subsampled output images to one or more of the neural networks to be processed therein; and wherein the N neural networks and the pixel alignment layer are simultaneously trained using inner feedback loops and an outer feedback loop respectively, making discrete, categorical choices of pixels of the X different types such that the pixel alignment pattern is optimized with respect to performance of the N camera tasks subject to a user-determined balance of priorities among the N camera tasks.

* * * * *